United States Patent [19]

Pecot et al.

[11] Patent Number: 5,207,292
[45] Date of Patent: May 4, 1993

[54] PROCESS AND APPARATUS FOR LUBRICATING THE INSIDE OF A BURIED CONDUIT SIMULTANEOUSLY WITH THE FORCING THERE-THROUGH OF A CABLE BY COMPRESSED AIR

[75] Inventors: Alain Pecot; Yvon Beaumanoir, both of Lannion, France

[73] Assignee: France Telecom Etablissement autonome de droit public, Paris, France

[21] Appl. No.: 827,162

[22] Filed: Jan. 28, 1992

[30] Foreign Application Priority Data

Jan. 29, 1991 [FR] France .................................. 91 00989

[51] Int. Cl.⁵ .............................................. F16N 7/30
[52] U.S. Cl. ................................. 184/15.1; 184/55.1; 118/306; 118/408; 427/238
[58] Field of Search .................... 184/15.1, 15.2, 15.3, 184/16, 17, 18, 19, 55.1; 427/238, 384, 443; 118/408, 306

[56] References Cited

U.S. PATENT DOCUMENTS

| | | | |
|---|---|---|---|
| 3,211,573 | 10/1965 | Hight et al. | 427/238 |
| 3,322,559 | 5/1967 | Eskijian | 427/238 |
| 3,394,025 | 7/1968 | McCune | 427/238 |
| 4,108,279 | 8/1978 | Marcell | 184/15.1 |
| 4,137,623 | 2/1979 | Taylor | 184/15.1 |
| 4,397,890 | 8/1983 | Kinumoto et al. | 427/238 |

FOREIGN PATENT DOCUMENTS

| | | | |
|---|---|---|---|
| 2191314 | 2/1974 | France . | |
| 2383538 | 10/1978 | France . | |
| 0311319 | 7/1930 | United Kingdom | 427/238 |
| 1242013 | 8/1971 | United Kingdom . | |

Primary Examiner—Ira S. Lazarus
Assistant Examiner—Alan Cariaso
Attorney, Agent, or Firm—Roland Plottel

[57] ABSTRACT

A process for simultaneously lubricating the interior wall of a underground conduit, while by use of compressed air, placing in the conduit a cable along the entire length of the conduit. The cable is drawn through the conduit by a puller, or comparable device, which is connected to the head of the cable, and rests in the conduit in a substantially air tight relation. This puller transmits a traction force to draw the cable through the conduit. The internal surface of the conduit is lubricated substantially uniformly over the entire length as the puller travels along the conduit by means of a reservoir of lubricant of a variable volume. This reservoir is at the rear of the puller, but in front of the cable. The lubrication and placement of the cable is along the entire length of the conduit. The invention also concerns an apparatus for carrying this process.

7 Claims, 2 Drawing Sheets

PROCESS AND APPARATUS FOR LUBRICATING THE INSIDE OF A BURIED CONDUIT SIMULTANEOUSLY WITH THE FORCING THERE-THROUGH OF A CABLE BY COMPRESSED AIR

The present invention relates generally to a process for placing in a conduit of great length, an electric cable, for example, of the type having optical fibers; and more particularly for carrying out simultaneously with placing the cable a continuous lubrication of the internal surface of the conduit to facilitate the sliding of the cable, and thus avoiding the friction and eventual sticking of the cable to the conduit. The invention also relates to an apparatus for carrying out the process.

It is already known in the prior art that there are many techniques for placing a cable in a conduit. They include compressed air, where there is an injection of compressed air at one end of the conduit, and a flow of air under pressure of a predetermined quantity which exerts on a cable puller, piston, or analogous device, connected to one end or at the head of the cable. The compressed air acting on the puller exerts a sufficient traction force to drag the cable, as it is unwound, a spool located on the exterior along a considerable length of the conduit.

It is known that it is often necessary to add an efficient lubricant to the conduit, particularly when the sections thereof are very long, and for example which may be 2,400 meters without interruption.

The coefficient of friction created between the cable and the internal surface of the conduit must be the smallest amount possible, bearing in mind the lubricant in practice should be uniformly placed over the entire distance which the cable must be drawn.

There has already been proposed solutions to simultaneously lubricate and inject air under pressure. This lubrication being brought about at the time the cable is brought into one end of the conduit. In particular, such a scheme is shown in published French patent application No. 89.16470 of Dec. 13, 1989, which is in the name of the applicants, and which describes and claims an injection gun assembly associated with a reservoir of lubricant. The assemblage facilitates and brings about a continuous aspiration of the lubricant along the cable as it penetrates in the conduit.

However, lubrication is brought about only at entrance of the conduit and is not uniformly propagated along the entire length, thus limiting its efficacy. It is then necessary to pre-lubricate the internal surfaces of the conduit when it is fabricated at the factory. This presents some difficulties. Often it is more expensive, and has the inconvenience that this lubrication is not laid dow at the place, and at the same time the cable is placed, by compressed air, in the buried conduits; also, the conduits to be filled may often be installed very far away from the factory where they are made. Also, if a significant amount of times separates the lubrication and the blowing of the cable, there follows the result of a possible aging of the lubricant, and an undesirable alteration of its lubricating qualities.

With a liquid lubricant, the inconveniences are limited, but there are other disadvantages, particularly the lubricant in the conduit may be compromised when the conduit is placed in the ground. Those points which are lowest may act as siphons or collection points and bring about a result which is counterproductive to the good passage of the cable through the conduit. It may often make it impossible to bring about the good passage of the puller which draws the cable, which may be completely blocked as it goes through such pools of lubricants which it finds.

In another prior art techniques, such as the one described in French patent A 2,191,314 or European patent A 0,060,173, the conduit may also be lubricated in the field just before the cable is drawn through. But in such arrangements, the length of the cable which must be effectively blown through the length of the conduit must be limited to not more than about 300 meters. Moreover, in the case where the lubricant is made up of microspheres of a plastic material, as shown in European patent A 0,060,173, the use of a puller cannot be done because it chases these microspheres out of the conduit during the blowing and thus eliminates their lubricating effect which was sought after.

The present invention has as an object a process and apparatus which permits lubrication of the internal walls of a conduit along all the length thereof, simultaneously with the dragging through thereof, by blowing, of a cable along the interior of this conduit.

To this result, the process of the invention brings about the putting in place of a cable in a conduit by the injection of compressed air at one of the extremities of the conduit, and through which is drawn the cable through the use of a puller or its analog, mounted or connected to one end of the cable, and which puller is a substantially air tight seal with the inside wall of the conduit. The puller transmits a traction force for dragging the cable. It cooperates to lubricate continuously the internal surface of the conduit as it is displaced therein and by using a reservoir of lubricant, of a variable volume, limited and in contact with the internal walls of the conduit. The reservoir is behind the puller, but in front of the cable, and is moved along the length of the conduit.

The invention also relates to an apparatus for carrying out the process. It has a first puller connected to the head of the cable. The puller has an external diameter, or a transverse dimension, slightly less than the internal diameter of the conduit. A second puller is placed a predetermined distance from the first and in front of it, in the direction of the movement of the cable in the conduit. The second puller is joined to the first puller by a flexible connection. The second puller has an external diameter substantially equal to the internal diameter of the conduit. The space between the two pullers and the interior wall of the conduit forms a moving reservoir for a predetermined volume of lubricant. This volume is a function of the total length of the conduit where the cable is to be placed, and the amount of lubricant to be placed behind the first puller and around the periphery of the walls.

According to another aspect of the invention, there is an apparatus having a flexible connection between the first and second pullers, and it is made by a flexible connecting wire of a kind which is adapted to accommodate the variations of the distance between these pullers and which goes along with the emptying of the reservoir of the lubricant which takes place while the cable is laid down along the length of the conduit.

Advantageously, each puller has a central body, terminated at its back portion by a guide ring which is slightly open and in front thereof by a head which is spread out at least partially, transversal in a direction of the internal walls of the conduit.

According to another aspect of the invention, the head of the first puller has, with regard to the second puller, a connecting hook attached to the flexible connection cable and in the rear a thin annular sleeve making a connection between the central body and extending in the direction of the internal wall of the conduit. Preferably, the thin sleeve as a conical surface terminating in a cylindrical edge, having between the sleeve and the internal wall of the conduit, a reduced or small annular space in order to permit a controlled release of the lubricant when the puller is moved along the conduit.

According to an aspect of the invention the first and second pullers are made of a material which have a low coefficient of friction in relation to the internal wall of the conduit, for example, polytetrafluoroethylene "Teflon" for analogous material.

Other characteristics of the process for lubricating a buried duct simultaneously with the drawing of a cable in this duct, and an apparatus for the carrying out of this process will be apparent and seen from the following description of one embodiment and which shows the invention by way of a non-limiting example, and with reference to the drawings in which.

Figure 1:
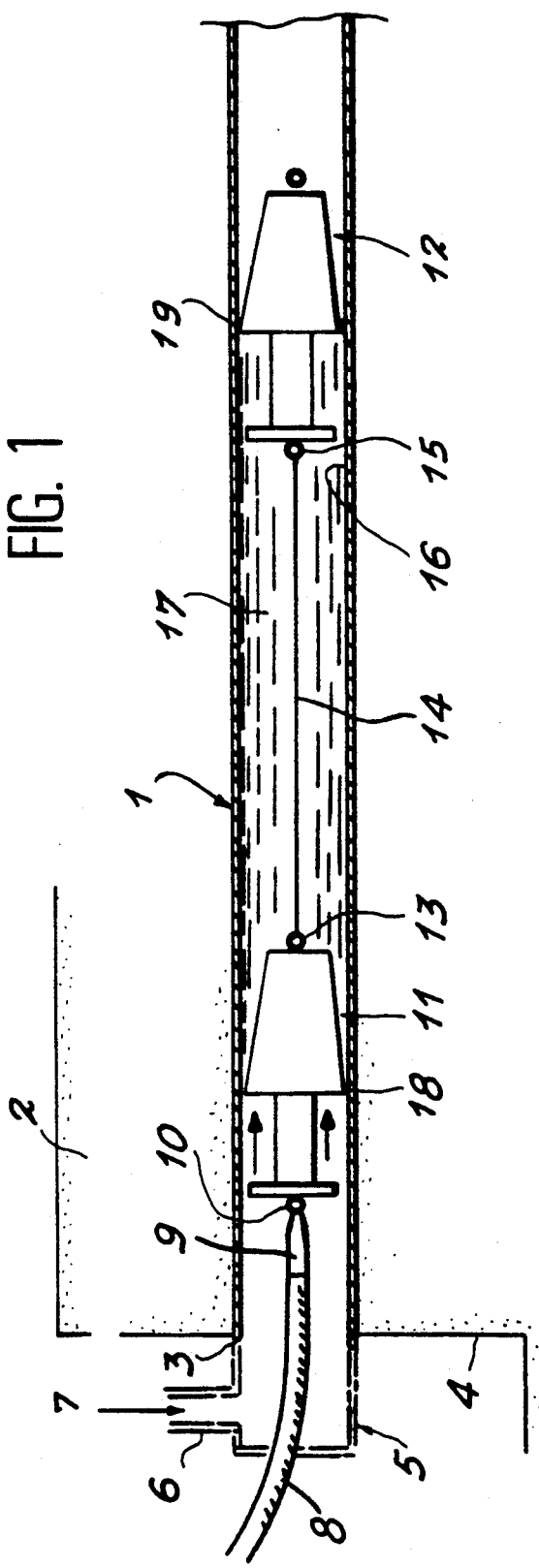
FIG. 1 is a partial longitudinal sectional view of a buried conduit in which the cable puller is used with two pullers joined together by a flexible connection, according to a method and apparatus of the invention.

As shown in FIG. 1 there is a buried duct or conduit 1 designed to be buried at a predetermined depth under a surface 2. This conduit is open at its two ends, only one of which 3 is shown in the figure, and that end is mounted in an access chamber 4. The distance that separates the two consecutive access chambers which defines the length of the conduit may be fairly long, and for example 2,400 meters. At the end 3, there is mounted an injection gun assembly 5, shown very schematically and which may be of any convenient or conventional type. The injection gun permits (a) the introduction, via an input tube 6, of compressed air (shown schematically by an arrow 7) with a quantity and a sufficient pressure, and (b) at the same time, the bringing in of a cable 8 which is to be placed in the conduit 1. The cable is forced through the conduit due to the pressure of the compressed air which exerts pressure on the cable puller to which the cable is attached.

In the embodiment shown, the cable 8 is, for example, a shielded cable having a plurality of optical fibers or without electrical conductors, and which for example are for telephone use. The cable puller has at one end an anchoring device or hook for pulling 9, which is joined to a connector 10 at the back portion of a first cable puller or piston 11, mounted in the inside of the conduit 1, and in front of the cable 8.

The first puller 11 is connected to a second cable puller or piston 12, the structures and details of which will be described in greater detail below. The puller 11 has in its forward portion, which is that portion opposite the connector 10, a hook 13 to which is attached an end of a flexible connecting wire 14, which is joined at its opposite end to a connector 15, which is similar to the connector 10, but which is attached here, to the back of the second puller 12.

The two pullers 11 and 12 thus define between themselves and with an internal wall 16 of the conduit 1, a reservoir for a lubricant 17. The lubricant comes into contact with this inside wall along the entire length of the conduit 1, as the pullers are moved therein with the cable 8. The movement is brought about by the force of the compressed air introduced in the conduit by the injection gun assembly 5 which is at the back of the two pullers.

The first puller 11 has a configuration such that in its transverse dimension, which is most important, it forms with the internal wall 16 of the conduit 1, an annular space 18 of very small dimensions which is sufficient to permit movement of the puller, with the escape of a small amount lubricant from the reservoir 17, simultaneously with the movement of the puller and the cable in the conduit 1. In comparison, the second puller 12 has a maximum cross sectional dimension such that it almost comes into complete contact, at an interface region 19, with the inside wall 16. At this region 19, there is created such a tightness that, when there is movement of the pullers and cable 8 under the force of the compressed air, the lubricant from the reservoir 17 is not able to escape to any appreciable extend towards the front of the second puller 12, i.e. and then only then in a very limited amount relative to what passes between the first puller 11 and the walls 16. Thus, there is a squeezing out of the lubricant towards the rear of the first puller 11 through the crack 18, and the inside wall of the conduit 1 are lubricated along its entire length.

Figure 2:
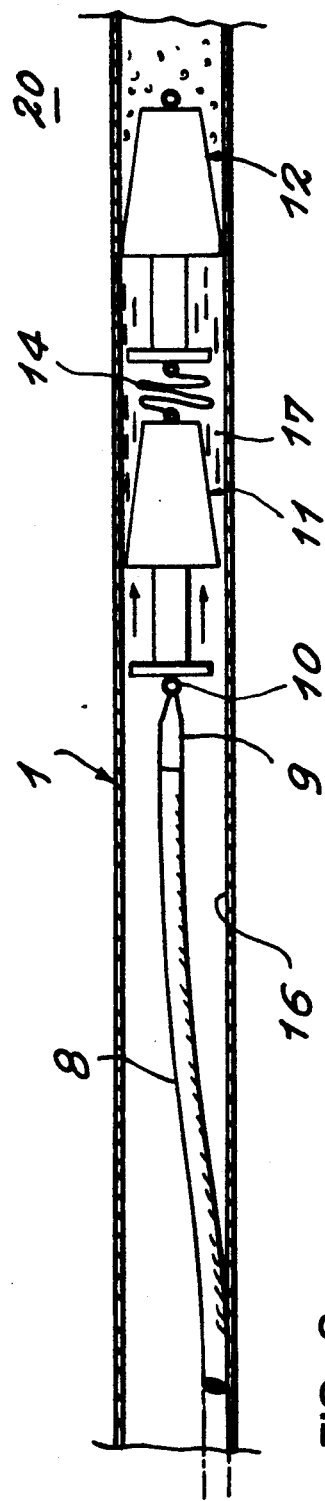
FIG. 2 is another view of the conduit as shown in FIG. 1, but close to the opposite end of the conduit at which cable was introduced, in order to illustrate the change of volume of the reservoir of the lubricant.

FIG. 2 illustrates the relative position of the two pullers 11 and 12 in the neighborhood of the output end of the conduit I, i.e. that end which is opposite to the input end 3 as shown in FIG. 1, and at which the head of the cable had been introduced. At the end of this process, the lubricant in the reservoir is almost entirely exhausted, the initial volume of the lubricant in the reservoir had been precisely determined as a function of the length of the conduit and the flow through the opening 18, and the speed of the movement of the cable under the effect of the blowing by compressed air forcing ahead the pullers and cable. At the end the flexible wire 14 between the two pullers is slack, permitting one to approach the other. At the front of the second puller 12, legend 20 schematically shows the presence of an emulsion of air and lubricant produced in this zone, due to the absence of a perfectly tight fit of the second puller at the contact region 19 and in a small flow of the lubricant in front of this puller caused by the pressure of the compressed air. This emulsion has a favorable effect in that it permits a better sliding of the second puller 12 against the wall 16 from one end to the other of the conduit.

Figure 3:
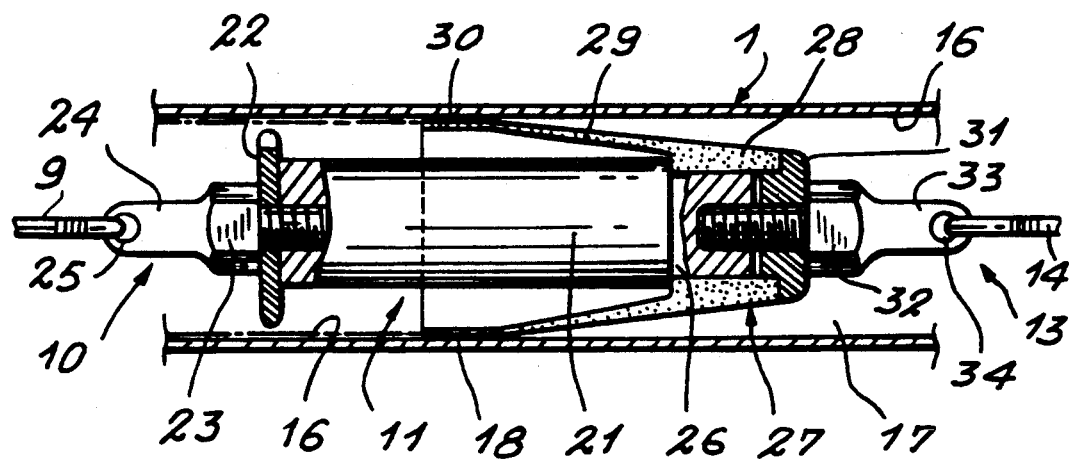
FIG. 3 is a sectional view, showing in greater detail the first puller first used in accordance with the invention.

FIG. 3 shows in more detail the structure of the first puller and the connector 10 which has the pulling hook 9 and which is to be connected to the front of the cable. The puller has a central body 21 which is generally of cylindrical shape. At a rear portion of the central body is a guide ring 22 laterally spaced in order to permit the passage of compressed air provided by the injection gun 5 and which is exerted on the puller. The guide ring 22 is attached to the rear of the body by a screw 23 forming part of the connector 10. Connector 10 extends rearward with a finger 24 with a hole therein 25 for making connection at its end which is in the form of a hook or eyelid and which forms the pulling hook 9. At the opposite end, the body 21 has a shoulder 26, which supports a head 27 of the puller. It includes a cylindrical member or ring 28 which has an extension of a thin sleeve 29, of substantially conical shape and which extends in the direction of the internal wall 16 of the conduit 1. This sleeve 29 terminates at the end opposite the ring 28 by an annular cuff 30 which is substantially coaxial with the common axis of the body 21 and the conduit 1, and which defines together with the wall 16 the annular opening 18 through which the lubricant from the reservoir 17 escapes. The ring 28 is held firm to the shoulder 26 of the body 21 by a collar 31, which itself is held in place by a screw 32. Screw 32 has a finger 33 and a hole therein which makes up the anchoring hook 13 at one end for connection to the connecting wire 14.

The second puller 12 has a structure substantially the same as that of puller 11 just described except for the annular cuff 30, which may be omitted. Also, the anchoring hook 13 at the front of this puller may be omitted. In place of the annular cuff the thin sleeve 29 is substantially in contact with the internal wall 16 of the conduit in the region 19 to bring about in this area a relatively tight fit in relation to the lubricant. Advantageously, the two pullers, and in particular their thin sleeves, or parts in contact with the conduit are made out of a material having a low coefficient of friction, for example of "Teflon". (Registered trademark of DuPont Corp.)

Figure 4:
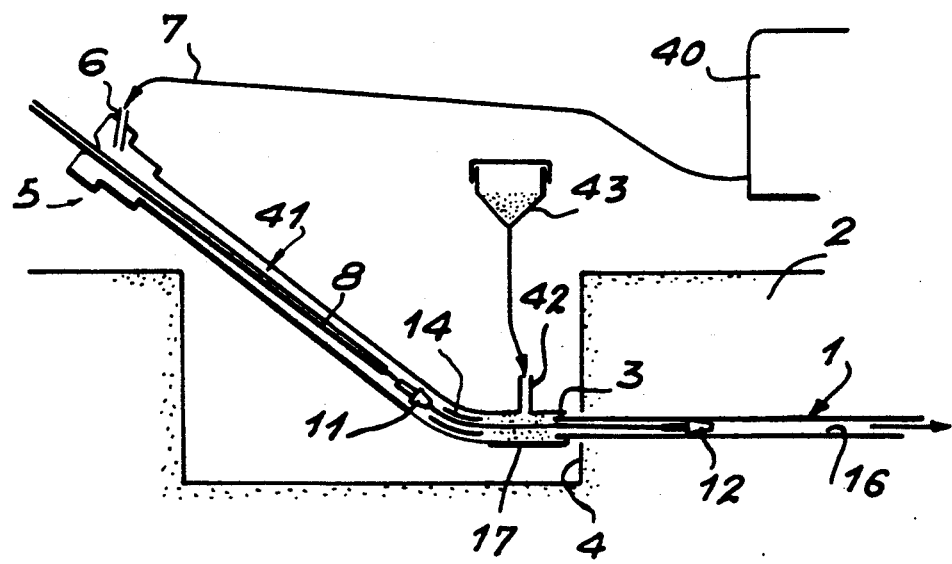
FIG. 4 is a schematic view, at a smaller scale, showing an apparatus for filling the reservoir with lubricant between the two pullers which are used for pulling the cable.

FIG. 4 shows in a smaller scale than the previous figures a positioning of the peripheral equipment for filling the reservoir with lubricant 17. Lubricant is introduced at the inside of the conduit 1 between the two pullers 11 and 12. In this figure there is schematically shown the injection gun assembly with its input pipes 6 for the compressed air 7 which is delivered by a compressor or other source 40 on the outside, for example on the surface above the buried conduit in the neighborhood of the manhole 4. The injection gun assembly 5 is joined to the end of the conduit whose end is opening into this manhole by means of a joining tube 41 which has a spout or feedtube 42 which is joined to a source 43 of lubricant. The first puller 11 is shown positioned in front of the feed tube, and the second puller behind. The source is thus connected to the reservoir 17, i.e. the space reserved for the lubricant formed between the two pullers. Once the pullers are introduced into the conduit 1 and the reservoir 17 filled with lubricant, then the tube 41 may be withdrawn. The injection gun assembly 5 is joined to the input of the conduit to introduce therein the compressed air which then presses upon the rear of the two pullers and exerts on them a force sufficient for their continuous advance of the cable 8 in the conduit 1.

The apparatus functions in the following manner. Under the force of the compressed air, the second puller 12, whose transverse dimension is such that it assures in the zone of contact with the internal wall of the conduit a relatively satisfactory tight fit, and constitutes a traction engine bringing about the dragging of the cable 8 under the effect of the air pressure thus furnished to the puller. This traction as transmitted between the two pullers and the connection 14 and the first puller 11 itself joined with a hook 9 to the cable. The first puller 11 thus has the lubricant in the reservoir 17, and permits, due to the presence of the annular opening 18 to place on the internal wall 16 a layer of lubricant, which in turn facilitates the movement of the cable.

Since the necessary pulling force and the pathway of the cable can become very large, in practice, since the length of the cable along the conduit approaches the total length, which is to put in the conduit, the second puller takes the task, in order to employ the maximum pulling force created by the air pressure, the connecting wire 14 may have thus a function of transmitting the force between the two pullers.

This arrangement with two pullers also permits the cleaning and passing over of local discontinuities of the diameter of the conduit and particularly the conduit connection joints. The second puller 12, being at the head of the assemblage of the two pullers may be slowed or stopped when passing a discontinuity. In this case, the first puller is automatically substituted for the other in the pushing effort force under the force of the compressed air. The flexible connection wire between the two pullers taking up without difficulty the pulling and some of the forces there between.

It should be understood that the invention is not limited to the embodiment shown, and may be directed to other embodiments which employ the scope and spirit of the invention, is intended to include all variations thereof.

We claim:

1. An apparatus for laying down a cable in a conduit comprising a first puller (11) to be connected (9) to the cable, and having a transverse dimension with an external diameter just slightly less than an internal diameter of the conduit (1), and a second puller (12) positioned at a predetermined distance from the first puller, and in front thereof in the direction of the movement of the cable in the conduit, and joined to the first puller by a flexible connection (14), said flexible connection (14) between the first puller (11) and the second puller (12) is formed of a flexible cable adopted to accommodate a change of the distance between the two pullers as said distance changes due to squeezing out of lubricant from a reservoir (17) between said two pullers and the laying down of the cable (8) along the length of the conduit (1), said second puller having an external diameter substantially equal to the internal diameter of the conduit, the volume formed between the two pullers and the inside wall of the conduit forming said reservoir for a volume of lubricant which is determine as a function of the total length of the conduit where the cable is to be placed, and the amount of lubricant which is to be spread out behind the first puller and the periphery thereof.

2. An apparatus according to claim 1, wherein each puller (11, 12) has a central body (21), having at its rear portion a guide ring (22) and in a forward portion a head (27) having a portion transverse to the direction of the internal wall (16) of the conduit (1).

3. An apparatus according to claim 1, wherein the head (27) of the first puller has at the front, with regard to the second puller, an anchoring hook (13) which is connected to the flexible connection (14), and at the rear portion of said head a thin sleeve (29), extending from the central body (21), in the direction of the internal wall (16) of the conduit (1).

4. An apparatus according to claim 3, wherein the thin sleeve (29) has a conical surface terminating in a substantially cylindrical rim (30) adapted to be positioned next to internal wall of the conduit with a small annular space (18), in order to permit the controlled oozing of the lubricant as the puller (11) moves in the conduit.

5. An apparatus according to claim 1, wherein the first and second pullers are made of a material with a low coefficient of friction with the internal walls of the conduit in close proximity to the conduit.

6. A method for placing a cable in a buried conduit comprising the steps of:
- placing a puller at one end of the conduit,
- attaching an end of the cable through said one end of said conduit to the puller,
- injecting a predetermined quantity of lubricant in the conduit at said one end thereof where the puller is connected to the cable with said lubricant occupying a volume defined by an end of the puller and the inside wall of the conduit, said volume and quantity being sufficient to continuously lubricate the inside wall of said conduit along its entire length,
- and then injecting compressed air into said conduit at said one end with sufficient pressure to move said puller and the attach cable along the entire length of the conduit while simultaneously playing out said cable into said conduit, and dispensing said lubricant substantially continuously over the inside wall of said conduit behind said moving puller and in front of said moving cable along the entire length of said conduit.

7. A method according to claim 6, wherein said puller comprises a pair of pullers separated from one another by a flexible cable, and said injecting of said lubricant is made between said two pullers, whereby said volume is defined by the facing ends of said two pullers and said inside wall of the conduit therebetween.

* * * * *